MEMORY MATRIX HAVING INTERLEAVED BIT WIRES

Filed March 19, 1968 2 Sheets-Sheet 1

INVENTOR
RICHARD M. GENKE

BY

Maleson Kimmelman & Ratner
ATTORNEYS

MEMORY MATRIX HAVING INTERLEAVED BIT WIRES

Filed March 19, 1968 2 Sheets-Sheet 2

INVENTOR
RICHARD M. GENKE
BY
Maleson, Kimmelman & Ratner
ATTORNEYS

United States Patent Office 3,543,256
Patented Nov. 24, 1970

3,543,256
MEMORY MATRIX HAVING INTERLEAVED BIT WIRES
Richard M. Genke, Colts Neck, N.J., assignor to Interdata, Inc., Oceanport, N.J.
Filed Mar. 19, 1968, Ser. No. 714,199
Int. Cl. G11c 7/02, 11/06
U.S. Cl. 340—174 5 Claims

ABSTRACT OF THE DISCLOSURE

A coincident current magnetic core memory matrix of the 2½ D type having bit wires arranged in groups. A plurality of ground planes are provided and at least one pair of bit wire groups is disposed on each ground plane. In the read cycle, each pair is driven so that half select read currents flow in opposite directions through adjacent bit wires.

BACKGROUND OF THE INVENTION

Field of the invention

This invention pertains to the field of coincident current magnetic core memory systems in which during read and write cycles half select currents are applied to both the bit and word wires.

Prior art

The trend in magnetic core memory systems has been towards larger memory capacity and faster cycle time. In order to accomplish these objectives the core size has been substantially reduced. However, decreasing core size, increases the difficulty of threading the four wires of a cubic (3 D) coincident current system through each of the cores. A fourth wire is usually necessary in a 3 D system since an inhibit winding is required to separate the groups of cores into bit planes during the write back operation.

In order to provide a more favorable magnetic to electronic circuit balance a 2½ D system has been designed which uses a maximum of three wires. This system preserves the decoding advantages of a 3 D system but has some of the cost advantages of a planar (2 D) linear select system. The 2½ D system combines a coincident current read cycle and a linear select write cycle. Specifically, this system separates the groups of cores by providing separate bit current drivers in each bit plane with each bit plane comprising a single group of bit wires or lines. During the read cycle, a half select current is driven on a selected word wire and a half select current is also driven on one bit wire of each bit wire group. In this manner, the selected cores are driven to the "0" state.

It is conventional to lay cores of a bit plane over a ground plane and to then lay the bit wires and the word wires on the ground plane. In addition a bit current driver is connected to either the left hand end or to the right hand end of all of the bit wires of the group associated with the ground plane. In this manner the bit current driver for each group of bit wires provides half select current in the bit wires in only one direction on the ground plane. As a result of this unidirectional half select current is induced in the ground plane which spreads out over the plane. For bit wires in substantially the center of the ground plane, the induced ground current may spread out in all directions. However, for bit wires at the edge of the ground plane, the induced current is restricted which results in a change in the characteristics of the half select current flow through these bit wires. Specifically, the change in characteristics relate to a change in current amplitude, a change in rise time and noise reflections.

In addition 2½ D memory systems have provided a substantially large value current flow from one to the other side of the ground plane. Accordingly there has been required a low impedance ground return between the bit current driver and the bit switches which connect the bit wires to a point of reference potential. In order to provide such low impedance ground return, capacitors have been used to provide decoupling between the driver and the reference point. If such capacitive ground return path is used it is important that the capacitor leads be substantially short. However in many systems the sides of the ground plane are physically substantially distant from each other and therefore the capacitor leads have been required to be long in length.

SUMMARY OF THE INVENTION

The memory system of the invention comprises a core matrix having a plurality of bit wires with the bit wires being arranged in a plurality of bit wire groups. At least pair of bit wire groups is disposed on one ground plane of a plurality of ground planes. The bit wires of a first group of a pair are separated by the bit wires of a second group of that pair. In this manner, the bit wires of a pair are interleaved. For each pair a half-select current in a first direction is applied to a selected bit wire of the first group of bit wires. A half-select current is applied to a selected bit wire of the second group in a second direction which is opposite to that of said first direction. Bit switches provide for the selection of adjacent bit wires for flow of said half-select read current. Thus in accordance with the interleaving of the bit wires and the application of half-select currents in opposite directions through adjacent bit wires there is produced a balancing of the induced ground currents. Accordingly a net ground current is provided which approaches zero as a limit.

BRIEF DESCRIPTION OF THE DRAWINGS

Referring now to FIG. 1 there is shown one ground plane 10 of a coincident current core memory matrix having a plurality of planes. Ground plane 10 has two groups of bit wires extending through cores 19 with each group comprising eight bit wires per group. A first bit wire group comprises bit wires 11–11*g* and a second group comprises bit wires 12–12*g*. A bit current driver 16 is connected to the left hand end of bit wires 12–12*g* and bit current driver 17 is connected to the right hand end of bit wires 11–11*g*. The right hand end of bit wires 12–12*g* are connected to bit switches 20 and the left hand end of bit wires 11–11*g* are connected to bit switches 22. The groups of bit wires are arranged so that a bit wire of the first group is adjacent a bit wire of the second group. Stated differently the bit wires are "interleaved" in that the bit wires of one of the groups is separated by bit wires of the other group.

Figure 1:
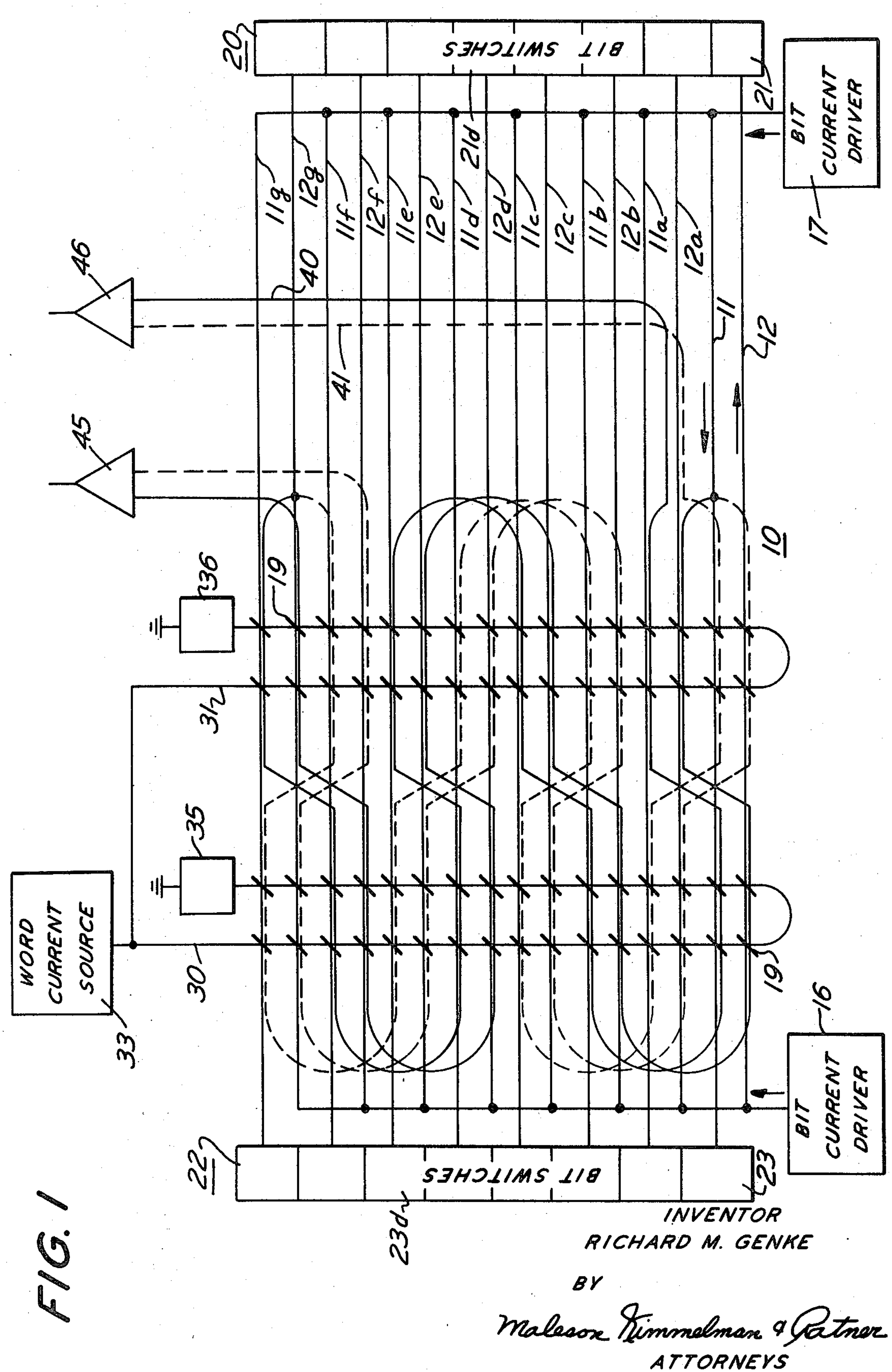
FIG. 1 illustrates in block diagram form a memory system embodying the invention.

Drivers 16 and 17 are actuated during the read cycle to provide half select current flow in the same direction; either in an upward direction from the drivers as illustrated or in a downward direction to the drivers. In this manner current flow through a selected wire of bit wire group 11–11*g* is always in an opposite direction to that of a selected wire of bit wire group 12–12*g*. Bit switches 20 and 22 are actuated to select only one bit wire of each bit wire group and to connect that bit wire to a point of reference potential or ground. 2½ D memory systems having a plurality of ground planes and including bit current drivers and bit switches are described in detail in an article by T. J. Gilligan, 2½ D High Speed Memory System—Past, Present, and Future, IEEE Transactions on Electronics Computers, volume EC–15, No. 4, page 475 et. seq., August 1966.

Bit switches 20 and 22 each comprise a plurality of bit switches 21–21*g* and 23–23*g* respectively with each bit switch associated with a corresponding bit wire. The selection logic of the computer associated with the memory matrix actuates only one bit switch at any one time thereby to connect the associated bit wires to ground. Simultaneous with the bit switch actuation, the selection logic actuates bit drivers 16 and 17. Specifically at any one time bit switch 21 associated with bit wire 12 and bit switch 23 associated with bit wire 11 may be actuated so that half select read current flows from drivers 16 and 17 respectively in the illustrated direction. Thus adjacent wires 11 and 12 have been selected. At another time bit switch 21*d* associated with wire 12*d* and bit switch 23*d* associated with wire 11*d* may be actuated so that half select read current only flows through these adjacent bit wires.

In accordance with the invention bit switches 20 and 22 are actuated by the computer selection logic to provide for flow of half select current during the read cycle only to a single bit wire in group 11–11*g* and a single bit wire in group 12–12*g* with the selected bit wires being adjacent each other. With the interleaving of the bit wires of the two groups of bit wires and the application of half select current in opposite directions only through adjacent bit wires there occurs cancellation or balancing of induced ground current. This balancing effect is shown in detail in FIG. 2.

Figure 2:
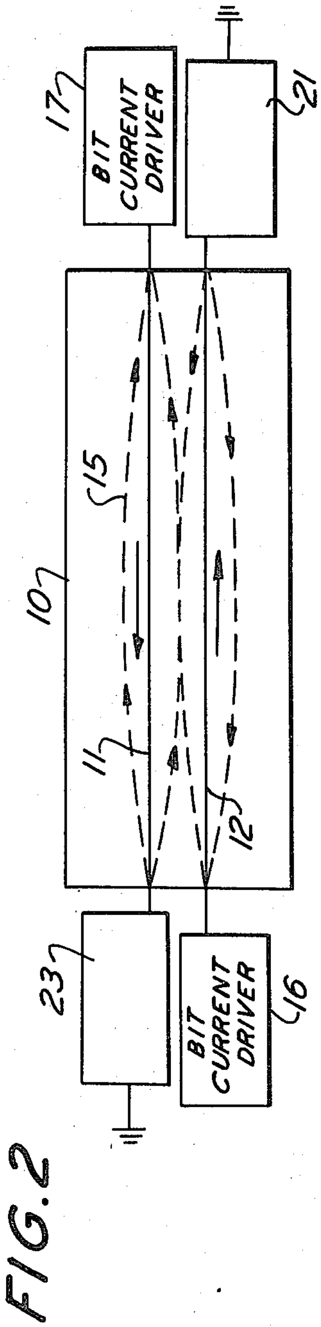
FIGS. 2 and 3 illustrate in more detail certain aspects of the invention.

In FIG. 2 the dashed lines show the direction of induced ground current in ground plane 10. Thus for half select read current in bit wire 11 in the illustrated direction from right to left, an induced ground current is produced about that wire flowing from left to right. Similarly for half select read current in bit wire 12 from left to right, the ground current flow is from right to left. In this manner the induced ground currents produced by current flow in adjacent bit wires overlap and produce a net or resultant ground current which approaches zero as a limit.

It will now be understood in accordance with the invention that two bit wire groups are provided for a single ground plane 10. One of the bit wire groups provides half select read current in one direction and the other group provides half select read current flow in the other direction with half select current only flowing through adjacent bit wires. In this manner the induced ground current are substantially balanced to produce a resultant induced ground current which approaches zero as a limit. By this balancing there is avoided the change in characteristics of the half select current flow through bit wires which are not substantially centered on ground plane 10.

An additional advantage of interleaving bit wires of two bit wire groups on a single ground plane is that the bit wires may be spaced very close to one another which is very desirable in the construction of the memory systems. However in printed wire circuitry it is difficult to terminate wires which are closely spaced if the terminations are also closely spaced as for example spaced apart by 25 mil (1 mil=0.001 inch). Thus if only a single bit wire group were on ground plane 10 all of the bit wires would terminate in single straight lines with the terminations being 25 mil apart. On the other hand, as illustrated in FIG. 1, by interleaving the two bit wire groups the adjacent wires may be 25 mil apart but adjacent terminations will be 50 mil apart. Specifically bit current driver connections for driver 17 provide separations of 50 mil between adjacent bit wires 11–11*g*. Similarly adjacent connections or terminations for driver 16 are 50 mil apart. Further, the adjacent terminations of wires 12–12*g* into switches 20 and wires 11–11*g* into switches 22 are 50 mil apart.

In conventional manner starting from the left of FIG. 1, a first word wire 30 threads cores 19 in a first column and then extends through a second column of cores. A second word wire 31 is threaded through a third column and then extends through a fourth column of cores 19. Thus each word wire threads two cores on each of the bit wires 11–11*g* and 12–12*g*. For simplicity the remaining word wires for the remaining columns of plane 10 have not been illustrated. Half select read current in a direction determined by the computer select logic is provided by a word current source 33 which applies current to one end of each of wires 30 and 31. The remaining ends of word wires 30 and 31 are connected to conventional word switches 35 and 36 respectively.

In addition, a conventional sense wire system is provided comprising sense wires having a first half wire 40 and a second half wire 41 connected to sense amplifiers 45 and 46. The structure and operation of word current systems and sense wire systems are described for example in the above cited article by Gilligan at pp. 478 and 481 and in an article by H. P. Zinschlag, A 2½ D Integrated Circuit Memory, Computer Design, September 1966, page 26, et. seq.

In the write cycle the computer selection logic is effective to operate bit current drivers 16 and 17 and switches 20 and 22 respectively to provide half select write current in a predetermined direction. The write operation is described in the above cited article by Gilligan.

Figure 3:
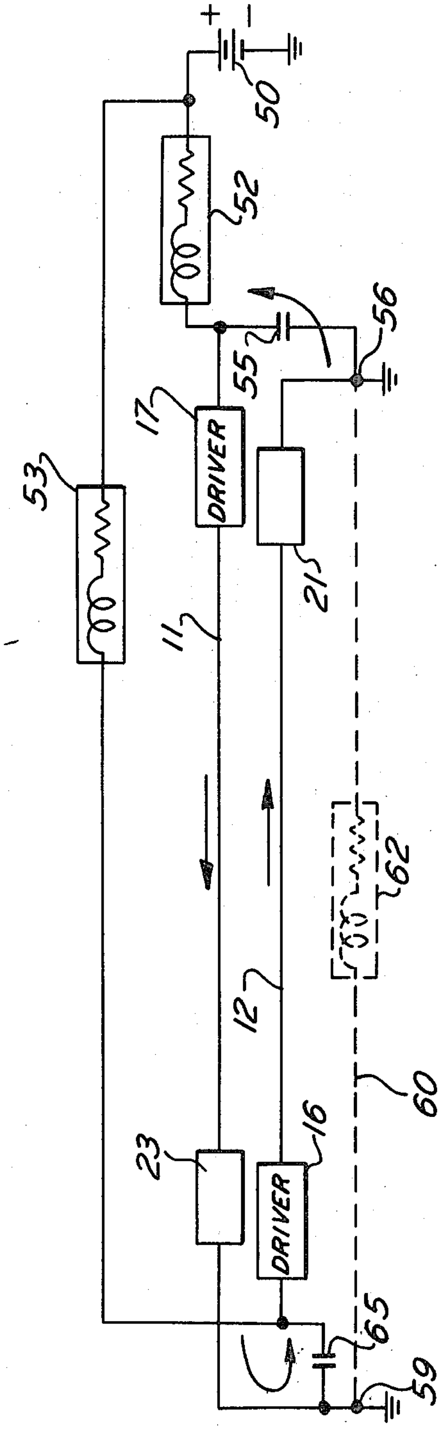

Referring now to FIG. 3 there is shown the manner in which capacitance decoupling is provided between the bit current drivers of FIG. 1 and the reference potential. It will be understood by those skilled in the art that in a practical memory system, a single power source is provided and is located in the power section of the computer memory system. That single power source is indicated by battery 50 in FIG. 3. Source 50 is connected to a plurality of bit current drivers within the memory system by way of impedances. Such impedances are unavoidable as a result of finite distances between the power source and the differing drivers, for example source 50 is connected by way of impedances 52 and 53 to drivers 17 and 16 respectively.

When drivers 16 and 17 are turned on, voltage drops are produced across impedences 52 and 53 in the form of voltage pulses. These pulses are difficult to control since impedances 52 and 53 are difficult to control. Accordingly, it is known to connect a capacitor 55 between current driver 17 and ground point 56 located at one end of ground plane 10. Ground point 59 is located at another end of plane 10. It will be understood that there is unavoidable impedance in ground path 60 between points 56 and 59, viz, impedance 62, which comprises inductance and resistance elements of the ground plane 10 and of the frame of the memory system. Accordingly impedance 62 may not be accurately predicted.

With single capacitor 55, current through bit wire 11 may be traced in the illustrated direction through switch 23 to ground point 59 and then by way of a ground return path 60 and impedance 62 to the actual ground point 56 to which capacitor 55 is connected. As a result impedance 62 provides a noncontrolled voltage pulse at reference point 59. In accordance with the invention, in order to eliminate the foregoing voltage pulse produced at reference point 59 with respect to reference point 56, a capacitor 65 is connected between point 59 and current driver 16. Accordingly with drivers 16 and 17 turned on, AC current flow may be traced through bit wire 11, switch 23, reference point 59, capacitor 65, driver 16, bit wire 12, switch 21, point 56, capacitor 55, driver 17 and then back to bit wire 11. In this loop all of the parameters of the bit wires and drivers are carefully controlled in impedance value and therefore the current flow may be accurately predicted. In addition since no AC current flows through ground connection 60 and impedance 62 there is no potential difference between reference points 56 and 59 and therefore either one of these reference points may be considered a true reference point.

With the above understanding of the invention, it will be understood that many modifications may be made. For example, the bit current drivers and bit switches may be of the type described in detail in my copending patent application Ser. No. 709,131, for Coincident Current Magnetic Core Memory Matrix, filed Feb. 28, 1968 and assigned to the same assignee as the present invention. Thus only a single group of bit switch pairs are used which are connected to the bit wire groups by way of ladder pairs corresponding in number with the number of bit wires in a group. Each ladder pair is connected by way of unidirectional devices to only one bit wire of each group. Each bit switch pair connects either one but not both conductors of a ladder pair to ground.

It will be understood that more than two (one pair of) bit wire groups having interleaved bit wires may be disposed or arranged on each ground plane. A plurality of pairs of groups may be disposed on a single ground plane with each pair of groups having half-select read current flowing in opposite directions only through adjacent bit wires. It will also be understood that the memory system of the present invention comprises a core matrix which may be divided into data words and data bits comprising the words. Each bit wire threads cores representative of the same bit position in the words.

I claim:

1. A memory system comprising a core matrix divided into data words and data bits comprising said words,
- a plurality of bit wires with each bit wire threading cores representative of the same bit position in said words,
- said bit wires being arranged in a plurality of bit wire groups,
- a plurality of ground planes, at least one pair of bit wire groups being arranged on each ground plane with the bit wires of a first group of a pair on a ground plane being separated by the bit wires of a second group of that pair,
- first driving means for each first group associated with a predetermined ground plane for applying a half-select current in a first direction for flow through a selected bit wire of said first group, first switching means connected to said first group and operable for providing said selection of a bit wire of said first group by completing a circuit for said flow of first direction half-select current,
- second driving means for each second group associated with said predetermined ground plane for applying half-select current for flow through a selected bit wire of said second group adjacent said selected bit wire of said first group in a second direction which is opposite to that of said first direction, second switching means connected to said second group operable for providing said selection of a bit wire of said second group by completing a circuit for said flow of second direction half-select current, and
- means for actuating in the read cycle said first and second driving means and first and second switching means to provide for flow of half-select current in opposite directions only through adjacent bit wires associated with the same ground plane.

2. A memory system comprising a core matrix divided into data words and data bits comprising said words,
- a plurality of bit wires with each bit wire threading cores representative of the same bit position in said words,
- said bit wires being arranged in a plurality of bit wire groups with each of said bit wire groups including an equal number of bit wires,

- a plurality of ground planes, at least one pair of bit wire groups being arranged on each ground plane with the bit wires of a first group of a pair on a ground plane being separated by the bit wires of a second group of that pair,
- first driving means for each first group associated with a predetermined ground plane for applying a half-select current in a first direction for flow through a selected bit wire of said first group,
- second driving means for each second group associated with said predetermined ground plane for applying half-select current for flow through a selected bit wire of said second group in a second direction which is opposite to that of said first direction,
- a plurality of pairs of conductors with said plurality corresponding in number solely with said number of bit wires in a group, unidirectional means connecting an end of each bit wire of a group to a differing one of said pairs of conductors whereby each pair is associated with solely one bit wire of each group
- switching means for each pair of conductors operable for connecting both conductors of a pair to a point of reference potential to complete a path for flow of said half-select current through the respective bit wires, and
- means for actuating in the read cycle said first and second driving means and a selected one of said switching means for flow of half-select current only (1) through bit wires associated with said selected switching means and (2) in opposite directions through adjacent bit wires associated with each ground plane.

3. A memory system comprising a core matrix divided into data words and data bits comprising said words,
- a plurality of bit wires with each bit wire threading cores representative of the same bit position in said words,
- said bit wires being arranged in a plurality of bit wire groups,
- a plurality of ground planes, at least one pair of bit wire groups being arranged on each ground plane with the bit wires of a first group of a pair on a ground plane being separated by the bit wires of second group of that pair,
- first driving means for each first group associated with a predetermined ground plane for applying a half-select current in a first direction for flow through a selected bit wire of said first group,
- second driving means for each second group associated with said predetermined ground plane for applying half-select current for flow through a selected bit wire of said second group in a second direction which is opposite to that of said first direction, and
- each ground plane having first capacitive means connected between said first driving means and a first point of reference potential located at one end of said ground plane and second capacitive means connected between said second driving means and a second point of reference potential located at another end of said ground plane whereby AC current does not flow through an impedence of said ground plane between said first and second points.

4. A memory system comprising a core matrix divided into data words and data bits comprising said words,
- a plurality of bit wires with each bit wire threading cores representative of the same bit position in said words,
- said bit wires being arranged in a plurality of bit wire groups,
- a plurality of ground planes, at least one pair of bit wire groups being arranged on each ground plane with the bit wires of a first group of a pair on a ground plane being separated by the bit wires of a second group of that pair, first driving means for each first group associated with a predetermined ground plane for applying a half-select current in a first direction for flow through a selected bit wire of said first group, second driving means for each second group associated with said predetermined ground plane for applying half-select current for flow through a selected bit wire of said second group in a second direction which is opposite to that of said first direction, each ground plane having first switching means for said first group operable for connecting said selected one of said bit wires to a point of reference potential for flow of said half-select current in said first direction, second switching means for said second group operable for connecting said selected one of said bit wires to a point of reference potential for flow of said half-select current in said second direction, and means for simultaneously actuating in the read cycle said first and second driving means and first and second switching means to provide for flow of half-select current in opposite directions only through adjacent bit wires associated with the same ground plane.

5. The memory system of claim 4 in which there is provided a plurality of word wires with each word wire threading predetermined cores on said bit wires, word driving means connected to said word wires operable for supplying a half-select current for flow through a predetermined one of said word wires.

References Cited

UNITED STATES PATENTS 3,419,856 12/1968 Doughty ------------ 340—174

OTHER REFERENCES

Journal of Applied Physics, Applications and Instrumentation, U. F. Gianola, "Low-Current, High-Speed Magnetic Memory Array Utilizing Evaporated Matrix Wiring," by Matcovich et al., vol. 35, No. 3, part 2, pp. 760, 761.

STANLEY M. URYNOWICZ, Jr., Primary Examiner